(12) United States Patent
Chen

(10) Patent No.: US 10,863,799 B2
(45) Date of Patent: Dec. 15, 2020

(54) SEATBELT BUCKLE ASSEMBLY

(71) Applicant: GM Global Technology Operations LLC, Detroit, MI (US)

(72) Inventor: Carter Chen, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/378,070

(22) Filed: Apr. 8, 2019

(65) Prior Publication Data
US 2020/0315301 A1    Oct. 8, 2020

(51) Int. Cl.
| | |
|---|---|
| *A44B 11/25* | (2006.01) |
| *B60R 22/18* | (2006.01) |
| *B29C 45/00* | (2006.01) |
| *B29C 45/16* | (2006.01) |
| *B29L 31/00* | (2006.01) |
| *B29K 23/00* | (2006.01) |

(52) U.S. Cl.
CPC ...... *A44B 11/2546* (2013.01); *B29C 45/0001* (2013.01); *B29C 45/16* (2013.01); *B60R 22/18* (2013.01); *B29K 2023/12* (2013.01); *B29L 2031/727* (2013.01); *B60R 2022/1806* (2013.01)

(58) Field of Classification Search
CPC .......... B29C 45/0001; A44B 11/2546
See application file for complete search history.

(56) References Cited

U.S. PATENT DOCUMENTS

| | | | | |
|---|---|---|---|---|
| 4,675,954 A | * | 6/1987 | Gullickson | A44B 11/2576 24/579.11 |
| 5,416,957 A | * | 5/1995 | Renzi, Sr. | A44B 11/2576 24/579.11 |
| 5,442,840 A | * | 8/1995 | Ewald | A44B 11/2576 24/579.11 |
| 6,055,708 A | * | 5/2000 | Ellis | A44B 11/2523 24/636 |
| 6,769,157 B1 | * | 8/2004 | Meal | A44B 11/2576 220/284 |
| 2009/0083955 A1 | * | 4/2009 | Smith | A44B 11/2523 24/633 |
| 2016/0129877 A1 | * | 5/2016 | Spahn | A44B 11/2523 24/593.1 |
| 2019/0021450 A1 | * | 1/2019 | Chen | A44B 11/2576 |
| 2019/0133260 A1 | * | 5/2019 | Boughner | A44B 11/2569 |

* cited by examiner

*Primary Examiner* — Robert Sandy
*Assistant Examiner* — Michael S Lee

(57) ABSTRACT

A method of forming a seatbelt buckle assembly comprises forming a housing by injection molding with a first mold cavity, allowing the injection molded housing to cool and cure, placing the housing into a second mold cavity, forming a debris shield by over-molding the debris shield directly onto portions of an outer surface of the housing within the second mold cavity, allowing the over-molded debris shield to cool and cure, and removing the housing with the over-molded debris shield from the second mold cavity.

11 Claims, 2 Drawing Sheets

SEATBELT BUCKLE ASSEMBLY

INTRODUCTION

Seatbelt buckle mechanisms include openings which may accidentally receive and allow entrance of objects, debris, and liquids other than a seatbelt tongue. Once these foreign objects, debris, and liquids get into the buckle, they tend to jam the buckle's latching mechanism and can block the seatbelt tongue from sufficient buckle entrance. Thus, the buckle will require proper cleaning and foreign object removal before it can again properly operate and connect with the seatbelt tongue. Accordingly, it is desirable to allow entrance of the seatbelt tongue into the seatbelt buckle while sealing the buckle opening to resist the passage of foreign objects and/or fluids.

SUMMARY

According to several aspects of the present disclosure, a seatbelt buckle assembly comprises a housing. The housing includes a body and a cover. A latching mechanism is positioned within the housing, wherein the cover is removably attachable to the body to enclose the latching mechanism therein. An opening is formed within the body, and a debris shield is over-molded directly onto the body of the housing. The debris shield covers portions of the body including the opening.

According to another aspect of the present disclosure, the debris shield has an inner surface and the body of the housing has an outer surface, wherein there are no gaps or spaces between the inner surface of the debris shield and portions of the outer surface of the body covered by the debris shield.

According to another aspect of the present disclosure, the debris shield has an inner surface and the body of the housing has an outer surface, wherein the inner surface of the debris shield is dimensionally identical to the portions of the outer surface of the body covered by the debris shield.

According to another aspect of the present disclosure, the debris shield comprises a closed end covering the opening in the body of the housing, a slot formed along a portion of the closed end and adapted to allow the passage of a seatbelt tongue and resist the passage of other objects or fluids, and at least one side wall extending from the closed end, wherein the at least one side wall is configured to cover a portion of a corresponding section of an outer surface of the body.

According to another aspect of the present disclosure, the closed end comprises a first flange and a second flange being in an overlapping relationship to define the slot. The first and second flanges are each adapted to flex during insertion of the seatbelt tongue to create a temporary gap which substantially conforms to the seatbelt tongue periphery.

According to another aspect of the present disclosure, the slot is formed along an inwardly tapered portion of the closed end. The inwardly tapered portion is adapted to guide the seatbelt tongue to the slot when the seatbelt tongue is inserted into the seatbelt buckle assembly.

According to another aspect of the present disclosure, the debris shield is adapted to sealably cover the opening in the body of the housing.

According to another aspect of the present disclosure, the housing and the debris shield are constructed in a substantially rectangular configuration.

According to another aspect of the present disclosure, the debris shield is made from rubber.

According to another aspect of the present disclosure, the debris shield is made from lightweight plastic.

According to another aspect of the present disclosure, the debris shield is made from a thermoplastic elastomer.

According to another aspect of the present disclosure, the debris shield is made from a phosphorescent material.

According to another aspect of the present disclosure, the debris shield and the housing are each made from a polypropylene-based material.

According to several aspects of the present disclosure, a method of forming a seatbelt buckle assembly comprises forming a housing by injection molding with a first mold cavity, allowing the injection molded housing to cool and cure, placing the housing into a second mold cavity, forming a debris shield by over-molding the debris shield directly onto portions of an outer surface of the housing within the second mold cavity, allowing the over-molded debris shield to cool and cure, and removing the housing with the over-molded debris shield from the second mold cavity.

According to another aspect of the present disclosure, forming a housing by injection molding with a first mold cavity further comprises: forming a housing made from a first polypropylene-based material by injection molding with a first mold cavity.

According to another aspect of the present disclosure, forming a debris shield by over-molding the debris shield directly onto portions of an outer surface of the housing within the second mold cavity, further comprises: forming a debris shield made from a second polypropylene-based material by over-molding the debris shield directly onto portions of an outer surface of the housing within the second mold cavity, wherein an inner surface of the debris shield is dimensionally identical to the portions of the outer surface of the body covered by the debris shield.

According to another aspect of the present disclosure, forming a debris shield by over-molding the debris shield directly onto portions of an outer surface of the housing within the second mold cavity further comprises: forming a debris shield made from a second polypropylene-based material by over-molding the debris shield directly onto portions of an outer surface of the housing within the second mold cavity, wherein the debris shield comprises a closed end covering the opening in the body of the housing, a slot formed along a portion of the closed end, the slot adapted to allow the passage of a seatbelt tongue and resist the passage of other objects or fluids, and at least one side wall extending from the closed end, wherein the at least one side wall is configured to cover a portion of a corresponding section of an outer surface of the body.

According to another aspect of the present disclosure, allowing the over-molded debris shield to cool and cure further comprises: allowing the over-molded debris shield to cool and cure, thereby forming a chemical bond between the inner surface of the debris shield and the portions of the outer surface of the housing covered by the debris shield due to chemical compatibility between the first and second polypropylene-based materials.

According to another aspect of the present disclosure, allowing the over-molded debris shield to cool and cure further comprises: allowing the over-molded debris shield to cool and cure, thereby forming a frictional bond between the inner surface of the debris shield and the portions of the outer surface of the housing covered by the debris shield due to shrinkage of the debris shield as it cools.

According to another aspect of the present disclosure, forming a housing by injection molding with a first mold cavity further comprises forming a housing by injection molding with a first mold cavity, wherein the housing is made from one of rubber, lightweight plastic, thermoplastic elastomer and phosphorescent material, and forming a debris shield by over-molding the debris shield directly onto portions of an outer surface of the housing within the second mold cavity further comprises forming a debris shield by over-molding the debris shield directly onto portions of an outer surface of the housing within the second mold cavity, wherein the debris shield is made from one of rubber, lightweight plastic, and a thermoplastic elastomer.

According to another aspect of the present disclosure, forming a housing by injection molding with a first mold cavity further comprises forming a housing by injection molding with a first mold cavity, wherein the housing is phosphorescent, and forming a debris shield by over-molding the debris shield directly onto portions of an outer surface of the housing within the second mold cavity further comprises forming a debris shield by over-molding the debris shield directly onto portions of an outer surface of the housing within the second mold cavity, wherein the debris shield is phosphorescent.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
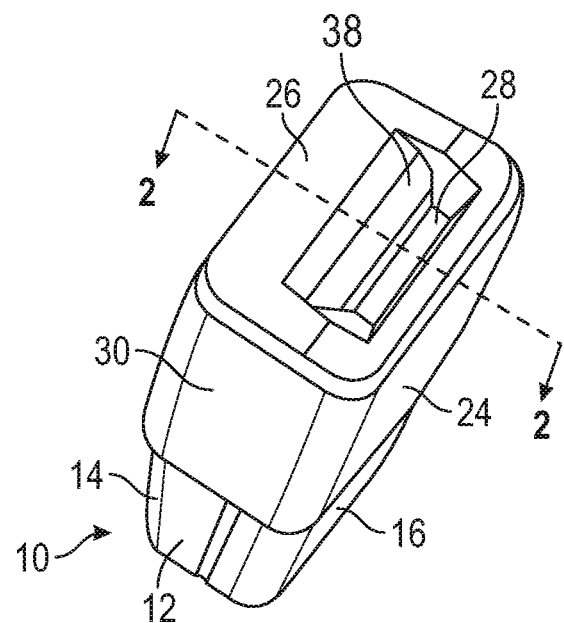
FIG. 1 is a perspective view of a seatbelt buckle according to an exemplary embodiment.
Figure 2:
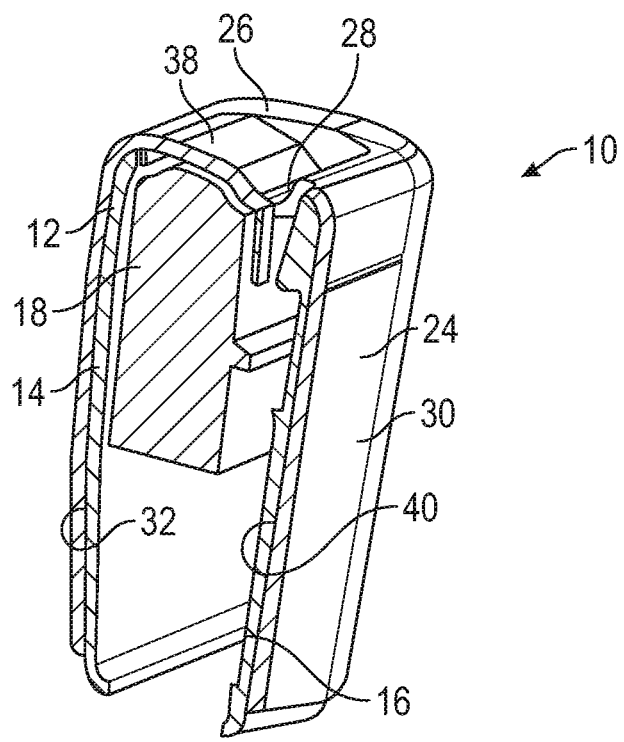
FIG. 2 is a sectional view taken along line 2-2 of FIG. 1.
Figure 3A:
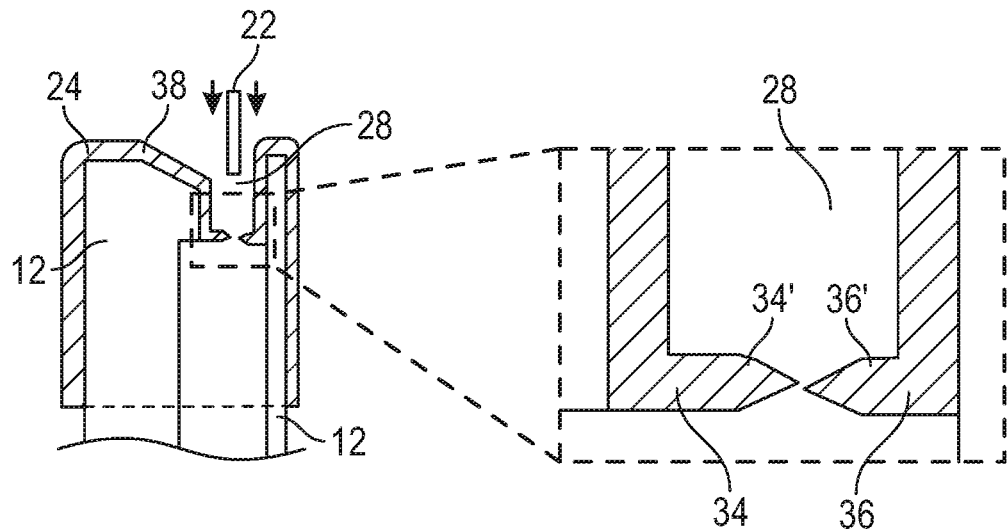
FIG. 3A represents the cutaway view of FIG. 2 with emphasis on one or more aspects of the present disclosure.
Figure 3B:
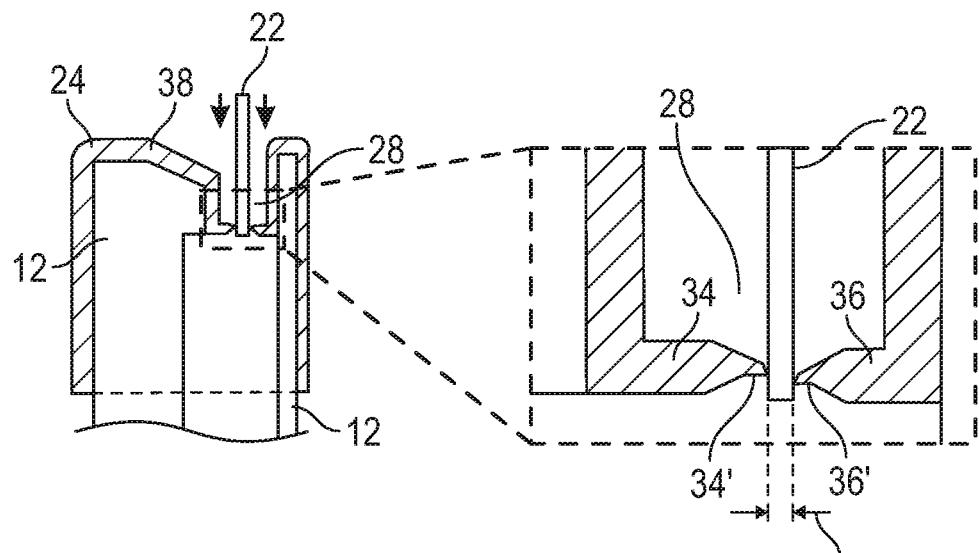
FIG. 3B represents the cutaway view of FIG. 2 with emphasis on one or more additional aspects of the present disclosure.

Referring to FIGS. 1 and 2, a seatbelt buckle assembly in accordance with the present disclosure is shown generally at 10. The seatbelt buckle assembly 10 includes a housing 12. The housing 12 includes a body 14 and a cover 16 that is detachably mounted onto the body 14. A latching mechanism 18 is positioned within the housing 12. The latching mechanism 18 fits within the body portion 14 of the housing 12 and the cover 16 attaches to the body 14 to enclose the latching mechanism 18 within the housing 12. The housing 12 includes an opening 20 formed within the body 14. The opening 20 allows a seat belt tongue 22 to enter the housing 12, as shown in FIGS. 3A and 3B. The seatbelt tongue 22 enters the housing to operationally engage the latching mechanism 18.

A debris shield 24 is over-molded directly onto the body 14 of the housing 12. The debris shield 24 covers portions of the body 14 including the opening 20, to prevent contaminants from entering the housing 12. Foreign objects and debris such as, but not limited to, coins, jewelry, dust, food, insects and liquids, such as, but not limited to, water and soft drinks. Receipt of these foreign objects, debris, and liquids tends to jam the componentry of the latching mechanism 18. Moreover, these foreign objects can block the seatbelt tongue 22 from properly entering the housing 12 and engaging the latching mechanism 18. Either situation can create a substantial risk of malfunction resulting in risk to the vehicle operator/passenger attempting to properly use the seatbelt. The seatbelt buckle assembly 10 therefore would require cleaning to remove these foreign objects/liquids and to ensure the latching mechanism 18 will properly operate and engage with the seatbelt tongue 22 to reduce the risk of malfunction. The debris shield 24 covers a portion of the housing 12, including the opening 20, to resist the passage of such foreign objects and/or fluids through the opening 16.

The debris shield 24 includes a closed end 26 covering the opening 20 in the body 14 of the housing 12. A slot 28 is formed along a portion of the closed end 26. The slot 28 is adapted to allow passage of the seatbelt tongue 22 and to resist passage of other objects or fluids. At least one side wall 30 extends from the closed end 26 and covers a portion of a corresponding section of an outer surface 32 of the body 14.

The closed end 26 of the debris shield 24 includes a first flange 34 and a second flange 36. The first and second flanges 34, 36 are in an overlapping relationship and define the slot 28 formed within the closed end 26. The first and second flanges 34, 36 are adapted to flex during insertion of the seatbelt tongue 22 to create a temporary gap 37 which substantially conforms to the seatbelt tongue 22 periphery and allows the seatbelt tongue 22 to enter the housing 12 and operationally engage with the latching mechanism 18. Spring force of the first and second flanges 34, 36 causes the gap 37 to conform to the periphery shape of the seatbelt tongue 22 and causes the first and second flanges 34, 36 to forcibly abut against sides of the seatbelt tongue 22. This behavior ensures a seal remains formed around the seatbelt tongue 22 throughout insertion into the opening 20. To ensure such flexing occurs, tips 34', 36' of the first and second flanges 34, 36 may have a substantially thinner construction than other portions of the debris shield 24. For example, the tips 34', 36' of the first and second flanges 34, 36 may be a half millimeter (0.5 mm) in thickness whereas the remaining portions of the debris shield 24 are approximately two millimeters (2 mm) in thickness.

The slot 28 is formed along an inwardly tapered portion 38 of the closed end 26. The inwardly tapered portion 38 guides the seatbelt tongue 22 to the slot 28 when the seatbelt tongue 22 is inserted into the seatbelt buckle assembly 10.

The debris shield 24 is adapted to sealably cover the opening 20 in the body 14 of the housing 12, to prevent any debris or liquids from entering the housing 12 around the debris shield 24. The debris shield 24 has an inner surface 40 and the body 14 of the housing 12 has an outer surface 32. The inner surface 40 of the debris shield 24 contacts the outer surface 32 of the body 14 of the housing 12 to create a seal between the debris shield 24 and the body 14 of the housing 12. There are no gaps or spaces between the inner surface 40 of the debris shield 24 and portions of the outer surface 32 of the body 14 that are covered by and in contact with the inner surface 40 of the debris shield 24. Because the debris shield 24 is over-molded directly onto the body 14 of the housing 12, the inner surface 40 of the debris shield 24 is dimensionally identical to the portions of the outer surface 32 of the body 14 covered by and in contact with the inner surface 40 of the debris shield 24.

As shown in the Figures, the seatbelt buckle assembly 10 is generally rectangular in shape. The debris shield 24 is constructed of a flexible material formed to fit around the rectangular housing 12. The debris shield 24 may be manufactured from materials such as, but not limited to, rubber or lightweight plastic, or some combination thereof (for example—thermoplastic elastomer (TPE)), by an over-molding injection molding process configured to form the debris shield directly onto the housing 12. Moreover, to ensure material flexibility, the debris shield 24 may be of a sufficiently thin construction, for example, having an average thickness of approximately two millimeters (2 mm). The debris shield 24 thus acts as a sealant and skin for the housing 12 and adds little volume around the seatbelt buckle assembly 10.

It is envisioned that the material used to manufacture the debris shield 24 may incorporate dye compositions which would provide a colorful, aesthetically pleasing, and/or easily viewed appearance for the seatbelt buckle assembly 10. For example, the material may have a bright red color to make the debris shield 24 pleasing to look at as well as easy to find within the vehicle interior. Similarly, the debris shield 24 may be manufactured from a material incorporating dye compositions that are phosphorescent in nature (i.e., glow-in-the-dark dye compositions). As a result, targeting and guiding the seatbelt tongue 22 towards the slot 28 may be made easier in a poorly lit/dim/dark environment through the glow-in-the-dark nature of the debris shield 24.

In one exemplary embodiment of the present disclosure, the debris shield 24 and at least the body 14 of the housing 12 are both made from a polypropylene-based material. Because of the chemical compatibility between the like materials, the over-molding process will create a chemical bond between the inner surface 40 of the debris shield 24 and the outer surface 32 of the body 14. This results in a debris shield 24 that is attached to the body 14 of the housing 12 in a way that makes it difficult to remove the debris shield 24 from the housing 12 without mechanical assistance. This ensures that the sealed engagement between the debris shield 24 and the housing 12 remains intact throughout the life of the seatbelt buckle assembly 10.

In another exemplary embodiment of the present disclosure, the debris shield 24 includes a plurality of side walls 30 that envelope portions of the outer surface 32 of the housing 12, as shown in FIG. 1. The debris shield 24 is injection molded onto the housing 12 in a molten state. Cooling of the debris shield 24 after over-molding onto the housing 12 may result in shrinking of the debris shield 24. Shrinkage of the debris shield 24 when cooling creates a tight fit of the debris shield 24 onto the housing 12, and increases the frictional forces holding the debris shield 24 onto the housing 12.

Figure 4:
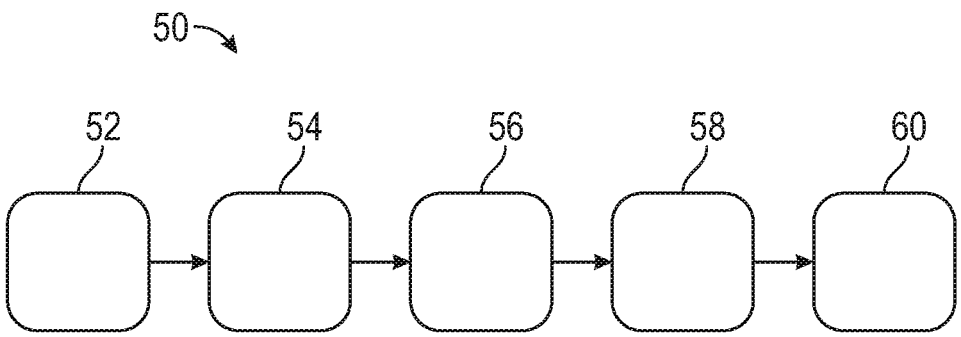
FIG. 4 is a schematic flow chart of the method of forming a seatbelt buckle assembly of the present disclosure.

Referring to FIG. 4, a method of forming a seatbelt buckle assembly is shown generally at 50. A seatbelt buckle assembly 10 is formed by injection molding 52 the housing 12 within a first mold cavity. After the housing 12 has cooled and cured 54, the housing 12 is removed from the first mold cavity and placed 56 into a second mold cavity. The debris shield 24 is injected molded in a molten state, so the material must be allowed to cool and solidify before removing from the first mold cavity. Furthermore, different materials cure as they cool, wherein the material goes through chemical changes due to the thermal treatment. The curing process changes the material properties of the debris shield 24. After cooling and curing, the debris shield will exhibit predictable material characteristics.

The debris shield 24 is over-molded 58 directly onto portions of the outer surface 32 of the housing 12. Once the over-molded debris shield 24 has cooled and cured 60, the finished seatbelt buckle assembly 10 is removed 62 from the second mold cavity.

As mentioned above, in one exemplary embodiment of the present disclosure, the debris shield 24 and the housing 12 are each injection molded using materials that are polypropylene-based. The housing 12 is allowed to cool and cure prior to over-molding the debris shield 24 thereon. Due to the chemical similarities between polypropylene-based materials, a chemical bond is formed between the debris shield and the body of the housing 12 when the debris shield 24 is over-molded onto the housing 12.

The seatbelt buckle assembly 10 of the present disclosure offers the advantage of keeping debris and liquids out of the housing 12 of the seatbelt buckle assembly 10 while allowing easy insertion of the seatbelt tongue 22 into the housing 12 to operationally engage the latching mechanism 18 of the seatbelt buckle assembly 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seatbelt buckle assembly comprising:
 a housing, the housing including a body and a cover;
 a latching mechanism positioned within the housing, wherein the cover is removably attachable to the body to enclose the latching mechanism therein;
 an opening formed within the body; and
 a debris shield over-molded directly onto the body of the housing, and covering portions of the body including the opening, the debris shield including:
  a closed end covering the opening in the body of the housing, the closed end including a first flange and a second flange being in an overlapping relationship to define a slot formed along a portion of the closed end, the first and second flanges each adapted to flex during insertion of a seatbelt tongue to create a temporary gap which substantially conforms to the seatbelt tongue periphery, whereby the slot is adapted to allow the passage of the seatbelt tongue and resist the passage of other objects or fluids; and
  at least one side wall extending from the closed end, wherein the at least one side wall is configured to cover a portion of a corresponding section of an outer surface of the body.

2. The seatbelt buckle assembly of claim 1, wherein the debris shield has an inner surface and the body of the housing has an outer surface, wherein there are no gaps or spaces between the inner surface of the debris shield and portions of the outer surface of the body covered by the debris shield.

3. The seatbelt buckle assembly of claim 1, wherein the debris shield has an inner surface and the body of the housing has an outer surface, wherein the inner surface of the debris shield is dimensionally identical to the portions of the outer surface of the body covered by the debris shield.

4. The seatbelt buckle assembly of claim 1, wherein the slot is formed along an inwardly tapered portion of the closed end, the inwardly tapered portion adapted to guide the seatbelt tongue to the slot when the seatbelt tongue is inserted into the seatbelt buckle assembly.

5. The seatbelt buckle assembly of claim 1, wherein the debris shield is adapted to sealably cover the opening in the body of the housing.

6. The seatbelt buckle assembly of claim 1, wherein the housing and the debris shield are constructed in a substantially rectangular configuration.

7. The seatbelt buckle assembly of claim 1, wherein the debris shield is made from rubber.

8. The seatbelt buckle assembly of claim 1, wherein debris shield is made from lightweight plastic.

9. The seatbelt buckle assembly of claim 1, wherein the debris shield is made from a thermoplastic elastomer.

10. The seatbelt buckle assembly of claim 1, wherein the debris shield is made from a phosphorescent material.

11. The seatbelt buckle assembly of claim 1, wherein the debris shield and the housing are each made from a polypropylene-based material.

* * * * *